United States Patent
Shankar et al.

(10) Patent No.: US 11,270,122 B2
(45) Date of Patent: Mar. 8, 2022

(54) EXPLAINABLE MULTI-ENTITY EVENT RECOGNITION

(71) Applicant: 3D Industries Limited, London (GB)

(72) Inventors: Sukrit Shankar, London (GB); Seena Rejal, London (GB)

(73) Assignee: 3D Industries Limited, London (GB)

( * ) Notice: Subject to any disclaimer, the term of this patent is extended or adjusted under 35 U.S.C. 154(b) by 130 days.

(21) Appl. No.: 16/861,209

(22) Filed: Apr. 28, 2020

(65) Prior Publication Data

US 2021/0334542 A1    Oct. 28, 2021

(51) Int. Cl.
  *G06K 9/00*     (2006.01)
  *G06N 3/08*     (2006.01)
  *G06K 9/62*     (2022.01)

(52) U.S. Cl.
  CPC ..... *G06K 9/00718* (2013.01); *G06K 9/00744* (2013.01); *G06K 9/6256* (2013.01); *G06K 9/6276* (2013.01); *G06K 9/6296* (2013.01); *G06N 3/08* (2013.01)

(58) Field of Classification Search
  CPC ........... G06K 9/00718; G06K 9/00744; G06K 9/6256; G06K 9/6276; G06K 9/6296; G06N 3/08
  See application file for complete search history.

(56) References Cited

U.S. PATENT DOCUMENTS

| | | | | |
|---|---|---|---|---|
| 8,547,437 | B2 * | 10/2013 | Buehler | G06K 9/32 348/169 |
| 2019/0332110 | A1 * | 10/2019 | Isele | G05D 1/0088 |
| 2019/0378036 | A1 * | 12/2019 | Tuzi | G06N 7/005 |
| 2020/0017117 | A1 * | 1/2020 | Milton | B60W 50/02 |
| 2021/0056713 | A1 * | 2/2021 | Rangesh | G06K 9/6267 |
| 2021/0312725 | A1 * | 10/2021 | Milton | G08G 1/0116 |

OTHER PUBLICATIONS

Redmon, et al., YOLOv3: An Incremental Improvement, [From Cornell University arXiv.org, open-access archive, on the internet at https://arxiv.org/; retrieved on Aug. 24, 20 from: arXiv:1804.02767v1 [cs.CV] Apr. 8, 2018 ], 6 pages.

(Continued)

*Primary Examiner* — Fayyaz Alam
(74) *Attorney, Agent, or Firm* — Jacob P. Rohwer; Newport IP, LLC

(57) ABSTRACT

An image processing system has a memory storing a video depicting a multi-entity event, a trained reinforcement learning policy and a plurality of domain specific language functions. A graph formation module computes a representation of the video as a graph of nodes connected by edges. A trained machine learning system recognizes entities depicted in the video and recognizes attributes of the entities. Labels are added to the nodes of the graph according to the recognized entities and attributes. The trained machine learning system computes a predicted multi-entity event depicted in the video. For individual ones of the edges of the graph, select a domain specific language function from the plurality of domain specific language functions and assign it to the edge, the selection being made at least according to the reinforcement learning policy. An explanation is formed from the domain specific language functions.

20 Claims, 10 Drawing Sheets

(56) References Cited

OTHER PUBLICATIONS

Besold, et al., "Neural-Symbolic Learning and Reasoning: A Survey and Interpretation," [From Cornell University arXiv.org, open-access archive, on the internet at https://arxiv.org/; retrieved on Aug. 24, 2020 from: arXiv:1711.03902v1 [cs.AI] Nov. 10, 2017 ], 57 pages.

Alvarez-Melis, et al., "Towards Robust Interpretability with Self-Explaining Neural Networks," [From Cornell University arXiv.org, open-access archive, on the internet at https://arxiv.org/; retrieved on Aug. 24, 2020 from: arXiv:1806.07538v2 [cs.LG] Dec. 3, 2018 ], 16 pages.

Rabinowitz, et al., "Machine Theory of Mind," [From Cornell University arXiv.org, open-access archive, on the internet at https://arxiv.org/; retrieved on Aug. 24, 2020 from: arXiv:1802.07740v2 [cs.AI] Mar. 12, 2018 ], 21 pages.

Samek, et al., "Toward Interpretable Machine Learning: Transparent Deep Neural Networks and Beyond," [From Cornell University arXiv.org, open-access archive, on the internet at https://arxiv.org/; retrieved on Aug. 24, 2020 from: arXiv:2003.07631v1 [cs.LG] Mar. 17, 2020 ], 24 pages.

Mott, et al., "Towards Interpretable Reinforcement Learning Using Attention Augmented Agents," [From Cornell University arXiv.org, open-access archive, on the internet at https://arxiv.org/; retrieved on Aug. 24, 2020 from arXiv:1906.02500v1 [cs.LG] Jun. 6, 2019 ], 16 pages.

Verma, et al., "Programmatically Interpretable Reinforcement Learning," [From Cornell University arXiv.org, open-access archive, on the internet at https://arxiv.org/; retrieved on Aug. 24, 2020 from: arXiv:1804.02477v3 [cs.LG] Apr. 10, 2019], 14 pages.

Hein, ,et al, "Interpretable Policies for Reinforcement Learning by Genetic Programming," [From Cornell University arXiv.org, open-access archive, on the internet at https://arxiv.org/; retrieved on Aug. 24, 2020 from: arXiv:1712.04170v2 [cs.AI] Apr. 4, 2018 ], 15 pages.

Bastani, et al., "Verifiable Reinforcement Learning via Policy Extraction," 32nd Conference on Neural Information Processing Systems (NeurIPS 2018, Dec.), Monreal, Canada, 11 pages.

Cao, et al., "OpenPose: Realtime Multi-Person 2D Pose Estimation using Part Affinity Fields," [From Cornell University arXiv.org, open-access archive, on the internet at https://arxiv.org/; retrieved on Aug. 24, 2020 from: arXiv:1812.08008v2 [cs.CV] May 30, 2019 ], 14 pages.

Girdhar, et al., "Video Action Transformer Network," Proceedings of the IEEE/CVF Conference on Computer Vision and Pattern Recognition (CVPR), 2019, pp. 244-253, [retrieved on Aug. 24, 2020 from: https://openaccess.thecvf.com/content_CVPR_2019/papers/Girdhar_Video_Action_Transformer_Network_CVPR_2019_paper.pdf ]10 pages.

Feichtenhofer, et al., "SlowFast Networks for Video Recognition," [From Cornell University arXiv.org, open-access archive, on the internet at https://arxiv.org/; retrieved on Aug. 24, 2020 from: arXiv:1812.03982v3 [cs.CV] Oct. 29, 2019 ], 10 pages.

Zhao, et al., "Video Captioning with Tube Features," Proceedings of the Twenty-Seventh International Joint Conference on Artificial Intelligence (IJCAI—18) May 2018, pp. 1177-1183.

Karpathy, et al., "Automated Image Captioning with ConvNets and Recurrent Nets," [retrieved on Aug. 24, 2020 from: https://cbmm.mit.edu/video/automated-image-captioning-convnets-and-recurrent-nets, posted Mar. 25, 2016 ], 105 pages.

Chu, et al., "Video Co-summarization: Video Summarization by Visual Co-occurrence," Proceedings of the IEEE/CVF Conference on Computer Vision and Pattern Recognition (CVPR), Jun. 9, 2015, [retrieved on Aug. 24, 2020 from: https://openaccess.thecvf.com/content_cvpr_2015/papers/Chu_Video_Co-Summarization_Video_2015_CVPR_paper.pdf], pp. 3584-3592.

Rochan, et al., "Video Summarization by Learning from Unpaired Data," Proceedings of the IEEE/CVF Conference on Computer Vision and Pattern Recognition (CVPR), Jun. 2019 [retrieved on Aug. 24, 2020 from: https://openaccess.thecvf.com/content_CVPR_2019/papers/Rochan_Video_Summarization_by_Learning_From_Unpaired_Data_CVPR_2019_paper.pdf], pp. 7902-7911.

Deniz, et al., "Fast Violence Detection in Video," The 9th International Conference on Computer Vision Theory and Applications, Dec. 2014, 10 pages.

Cheng, et al. "RWF-2000: An Open Large Scale Video Database for Violence Detection," [From Cornell University arXiv.org, open-access archive, on the internet at https://arxiv.org/; retrieved on Aug. 24, 2020 from: arXiv:1911.059113v2 [cs.CV] Apr. 17, 2020 ], 8 pages.

Li, et al., "A General Framework for Edited Video and Raw Video Summarization," [From Cornell University arXiv.org, open-access archive, on the internet at https://arxiv.org/; retrieved on Aug. 24, 2020 from: arXiv:1904.10669v1 [cs.CV] Apr. 24, 2019], 13 pages.

Mordvintsev, et al., "Growing Neural Cellular, Automata," https://distill,pub/2020/growing-ca/, downloaded Aug. 24, 2020, 21 pages.

Pilco, et al., "Graph Learning Network: A Structure Learning Algorithm," [From Cornell University arXiv.org, open-access archive, on the internet at https://arxiv.org/; retrieved on Aug. 4, 2020 from: arXiv:1905.12665v3 [cs.LG], Jun. 5, 2019 ], 11 pages.

Nichele, et al. "Deep Learning with Cellular Automaton-Based Reservoir Computing," Complex Systems vol. 26:Mar. 4, 2017, [retrieved on Aug. 24, 2020 from: https://content.wolfram.com/uploads/sites/13/2018/04/26-4-2.pdf], 21 pages.

Gilpin, "Cellular automata as convolutional neural networks," [From Cornell University arXiv.org, open-access archive, on the internet at https://arxiv.org/; retrieved on Aug. 24, 2020 from: arXiv:1809.02942v2 [nlin.CG] Jan. 16, 2020 ], 12 pages.

Zhou, et al., "Violence detection in surveillance video using low-level features," [retrieved on Aug. 24, 2020 from: https://journals.plas.org/plosone/article?id=10.1371/journal.pone.0203668], published Oct. 3, 2018, 9 pages.

Akti, et al., "Vision-based Fight Detection from Surveillance Cameras," [From Cornell University arXiv.org, open-access archive, on the internet at https://arxiv.org/; retrieved on Aug. 24, 2020 from; arXiv:2002.04355v1 [cs.CV] Feb. 11, 2020 ], 6 pages.

Cao, et al., "OpenPose: Realtime Multi-Person 2D Pose Estimation using Part Affinity Fields," arXiv: 1803:06199 , May 30, 2019, 14 pages.

Ren, et al., "Faster R-CNN: Towards Real-Time Object Detection with Region Proposal Networks," arXiv: 1506.01497, Jun. 2017; 39(6), 14 pages.

Simon, et al., "Complex-YOLO: An Auler-Region-Proposal for Real-time 3D Object Detection on Point Clouds," arXiv: 1812.08008, Sep. 24, 2018, 14 pages.

Tsogkas, et al., "Deep Learning for Semantic Part Segmentation with High-Level Guidance," arXiv: 1505.02438, Nov. 24, 2015, 11 pages.

\* cited by examiner

EXPLAINABLE MULTI-ENTITY EVENT RECOGNITION

BACKGROUND

Multi-entity activities, such as situations involving two or more people and/or objects are difficult to recognize accurately and efficiently. Consider video data depicting an interaction between a plurality of people in a shopping mall. It can be difficult to recognize whether the interaction is a negotiation around purchase of goods or whether the interaction is a malicious event. In the case of a video of traffic on a highway it can be difficult to recognize whether a situation involving a plurality of vehicles is safe or whether it is hazardous.

Where image and video data is analyzed to recognize multi-entity activities, the situations involved are often safety-critical. In safety-critical situations, where computing systems are being used to make automated decisions and potentially control downstream systems, there is a need to have human understandable explanations for the automated decisions.

The embodiments described below are not limited to implementations which solve any or all of the disadvantages of known multi-entity event recognition systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An image processing system for recognizing multi-entity activities is described. The image processing system has a memory storing a video depicting a multi-entity event, a trained reinforcement learning policy and a plurality of domain specific language functions. The image processing system has a graph formation module which computes a representation of the video as a graph of nodes connected by edges. A trained machine learning system recognizes entities depicted in the video and recognizes attributes of the entities. Labels are added to the nodes of the graph according to the recognized entities and attributes. The trained machine learning system is also configured to compute a predicted multi-entity event depicted in the video. The image processing system has a processor configured, for individual ones of the edges of the graph, to select an domain specific language function from the plurality of domain specific language functions and assign it to the edge, the selection being made at least according to the reinforcement learning policy. The image processing system has an output arranged to output the predicted multi-entity event and an associated human-understandable explanation. The explanation is formed from the domain specific language functions assigned to edges in a volume of interest of the video depicting the multi-entity event. The explanations comprise technical data which are computed in a fully automated matter using image and video processing technology.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

An entity is a person or object. A non-exhaustive list of examples of entities is: pedestrian, truck, car, motorbike, drone, highway, side road.

Figure 1:
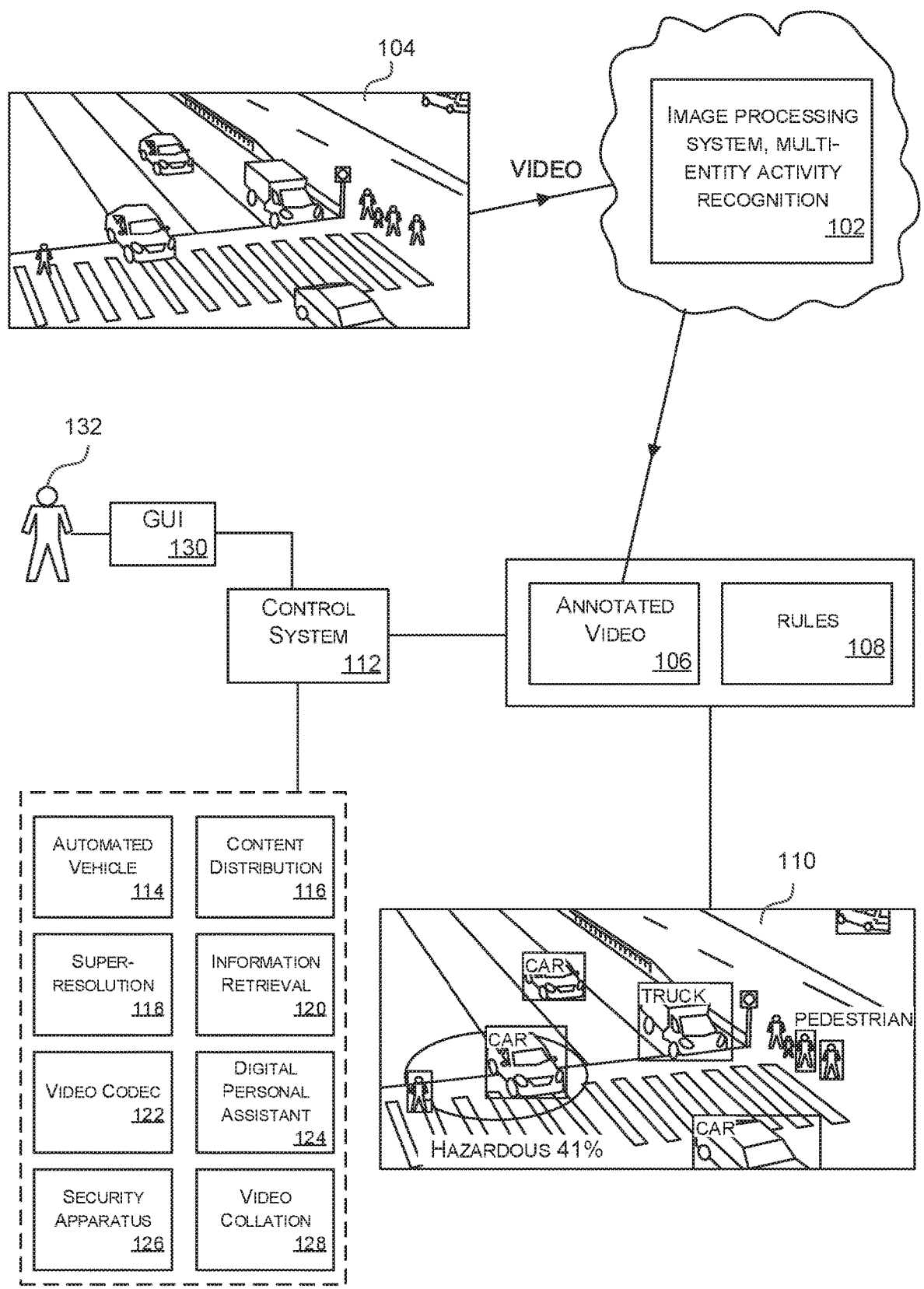
FIG. 1 is a schematic diagram of an image processing system for recognizing multi-entity activities.

FIG. 1 is a schematic diagram of an image processing system for explainable multi-entity event recognition, and which is deployed in the cloud. One or more capture devices such as web cameras, depth cameras, color video cameras, mobile phone cameras, medical imaging apparatus, automated vehicle cameras including drone cameras, head worn computer cameras, closed circuit television cameras, or other devices capture videos which are sent to the image processing system 100 in the cloud. The image processing system 100 comprises trained machine learning technology which processes the incoming video 104 and produces an annotated video 106 and one or more associated rules 108. The annotated video is a representation of the incoming video 104 to which a multi-entity event label has been assigned. The label is assigned according to a multi-entity event which it is predicted the incoming video 104 depicts. In some cases the annotated video also has annotations indicating entities recognized in the video and attributes of the entities. However, it is not essential to include the annotations of the individual entities and attributes. An example of an annotated video is shown at box 110 of FIG. 1.

The one or more rules 108 are computed from the video and are used to OW human understandable explanations of the recognized multi-entity event.

The predicted multi-entity event label and the associated rules 108 are sent to a control system 112 which controls a downstream system. A non-exhaustive list of examples of downstream systems controlled by the control system is: automated vehicle 114, content distribution system 116, super-resolution system 118, information retrieval system 120, video codec 122, digital personal assistant 124, security apparatus 126, video collation apparatus 128, disaster recovery apparatus (not shown) and others.

In examples facilitating human-in-the-loop deployments, the control system 112 is connected to a user interface whereby a human 132 is able to receive the rules 108 and the predicted label and is able to influence operation of the control system 112. In an example the human is able to trigger the control system 112 to power off the downstream system or to trigger the control system to come to a safe halt.

In the case where the control system 112 controls an automated vehicle 114 such as a self-driving car, the input video 104 is from sensors embedded in the self-driving car itself or in another entity such as a drone or a static camera located in the environment. In some cases the input video 104 is from a network of internet of things sensors in a smart city. The image processing system 100 is used to recognize hazardous or non-hazardous traffic situations and to compute a human understandable explanation of the hazardous/non-hazardous decision. In some cases the image processing system 100 is used to recognize traffic violation situations or non-traffic violation situations. In some cases the image processing system 100 is used to recognize car parking opportunities which meet car parking regulations and to recognize car parking opportunities which do not meet car parking regulations. The results from the image processing system are used to control the automated vehicle 114 and/or are presented at user interface 130 to a human 132.

In an example where a hazardous traffic situation, or a traffic violation situation is detected the control system 112 triggers the automated vehicle to hand over control of the vehicle to a human driver or to bring the vehicle to a halt in a safe manner. In an example where a car parking situation which meets regulations is detected the control system 112 presents information about the recognized multi-entity event to a human driver together with an explanation; or parks the automated vehicle in the identified car parking location.

In the case where the control system 112 controls a content distribution system 116 the image processing system processes videos which are uploaded to the content distribution system 116. The image processing system recognizes multi-entity activities depicted in the video, such as violence between a plurality of people, and applies a content distribution policy to the video accordingly.

In the case where the control system 112 controls a super-resolution system 118 the image processing system processes videos and identifies volumes in the videos which depict multi-entity activities. The volumes comprise regions of some but not all of individual frames in a sequence of frames from the video. The identified volumes are input to a conventional super-resolution apparatus 118 which increases the resolution of the video in the identified volumes so that when the identified volumes are rendered on a display, the resolution of the identified volumes is enhanced. Information about why the identified volumes were identified is also available to an end user as a result of the rules 108.

In the case where the control system 112 controls an information retrieval system 120 the multi-entity event labels are added to an index of a search engine to facilitate retrieval of videos according to multi-entity activities the videos depict. It is also possible to search within an individual video for particular multi-entity activities depicted in that video.

In the case where the control system 112 controls a video codec 122 the multi-entity event labels are taken into account when encoding the video data and/or when decoding the video data.

In the case where the control system 112 controls a digital personal assistant 124 the technology described herein is used to facilitate searching for videos and segments of videos. When a user requests topics in videos the technology described herein is used to identify those topics in videos and put markers around segments in videos depicting those topics. The topics are multi-entity activities. The time taken to search for relevant information across videos is thus reduced.

In the case where the control system 112 controls a security apparatus 126 such as a closed circuit television (CCTV) system it triggers an alert when violence is recognized in the incoming CCTV signal.

In the case where the control system 112 controls a video collation system 128, individual frames or ranges of frames in a video are labelled as depicting particular multi-entity activities. A user is able to search for ranges of frames in videos which depict particular types of multi-entity event. A live stream of explainable concepts underneath every video is presented in a graphical way using the rules 108.

The image processing system is also used for sports strategy in some cases. Video depicting team sports are processed by the image processing system to recognize particular types of multi-entity event and to provide explanations. The outputs are used by sports players to gain feedback about their performance and understand ways to improve.

In some examples the image processing system is used to analyze videos of disaster scenes to recognize multi-entity activities and aid disaster recovery personnel in prioritizing and facilitating recovery actions.

The image processing system is also used for analysis of videos of people in retail stores and retail environments in order to recognize multi entity activities for security purposes (detecting shop lifting) and/or to improve design and layout of the retail environment.

Figure 2:
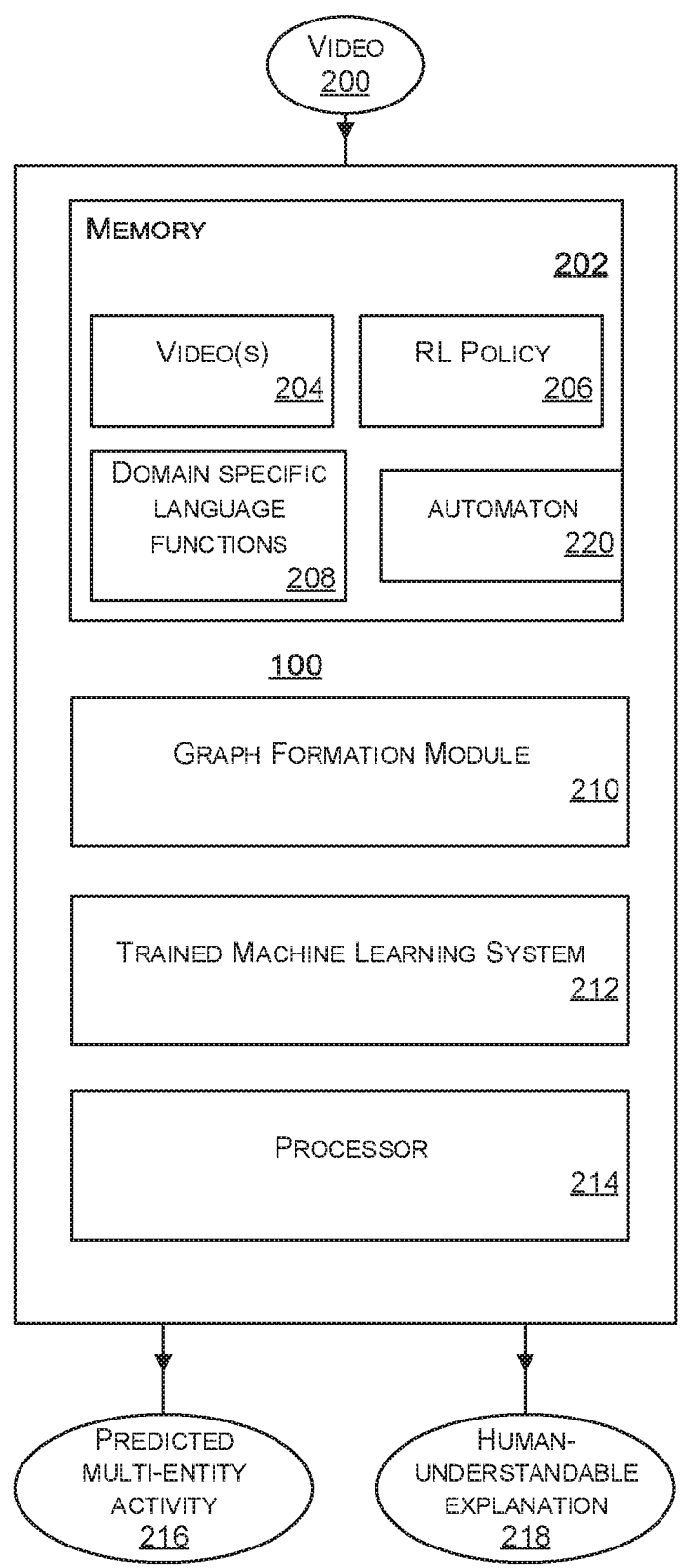
FIG. 2 is a schematic diagram of the image processing system of FIG. 1 in more detail.

FIG. 2 shows an example of the image processing system 100 of FIG. 1 in more detail. The image processing system 100 has a memory 202 storing at least one video 204 depicting a multi-entity event, a trained reinforcement learning policy 206 and a plurality of domain specific language functions 208. The image processing system 100 has a graph formation module 210 which computes a representation of the video as a graph of nodes connected by edges. A trained machine learning system 212 recognizes entities depicted in the video and recognizes attributes of the entities. Labels are added to the nodes of the graph according to the recognized entities and attributes. The trained machine learning system 212 is also configured to compute a predicted multi-entity event depicted in the video. The image processing system 100 has a processor 214 configured, for individual ones of the edges of the graph, to select a domain specific language function from the plurality of domain specific language functions 208 and assign it to the edge, the selection being made at least according to the reinforcement learning policy 206. The image processing system 100 has an Output arranged to output the predicted multi-entity event 216 and one or more rules which are usable to provide a human-understandable explanation 218. The explanation 218 is formed from the domain specific language functions assigned to edges of a graph representing a volume of interest of the video depicting the multi-entity event. Thus the outputs comprise not only recognition of a multi-entity event depicted in the video but also a human understandable explanation of why the particular multi-entity event was recognized.

Figure 3:
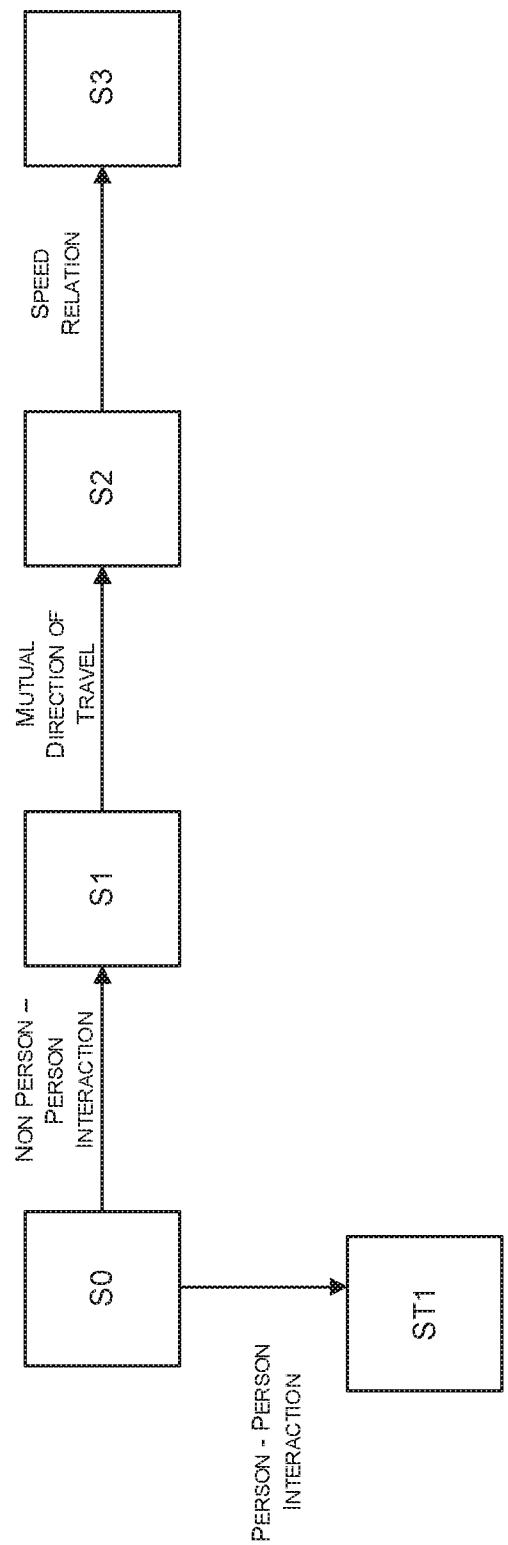
FIG. 3 is an automaton for use with an image processing system to detect road hazards.

In some examples the image processing system also has an automaton 220 stored in memory 202. However, it is not essential to use an automaton 220. The automaton 220 is a state machine Which is domain specific, that is, which has been formed for a particular application domain that the image processing system is to be used for. A state machine comprises a plurality of states interconnected by directed edges which define the criteria which are to be met for state transitions to occur. An example of an automaton 220 is given in FIG. 3 for the case where the image processing system is used for detecting hazardous road traffic situations. It comprises an initial state S0 connected to state S1 and state ST1. State S1 is connected to state S2 and state S2 is connected to state S3. A frame of a video begins in initial state S0 and moves to state ST1 if a person-person interaction is detected in the video. The video moves from state S0 to state S1 if an interaction between a non-person and a person is detected. The video moves from state S1 to S2 if a mutual direction of travel is detected between the non-person and the person. The video moves from state S2 to S3 if a speed relation is detected between the non-person and the person.

Figure 4:
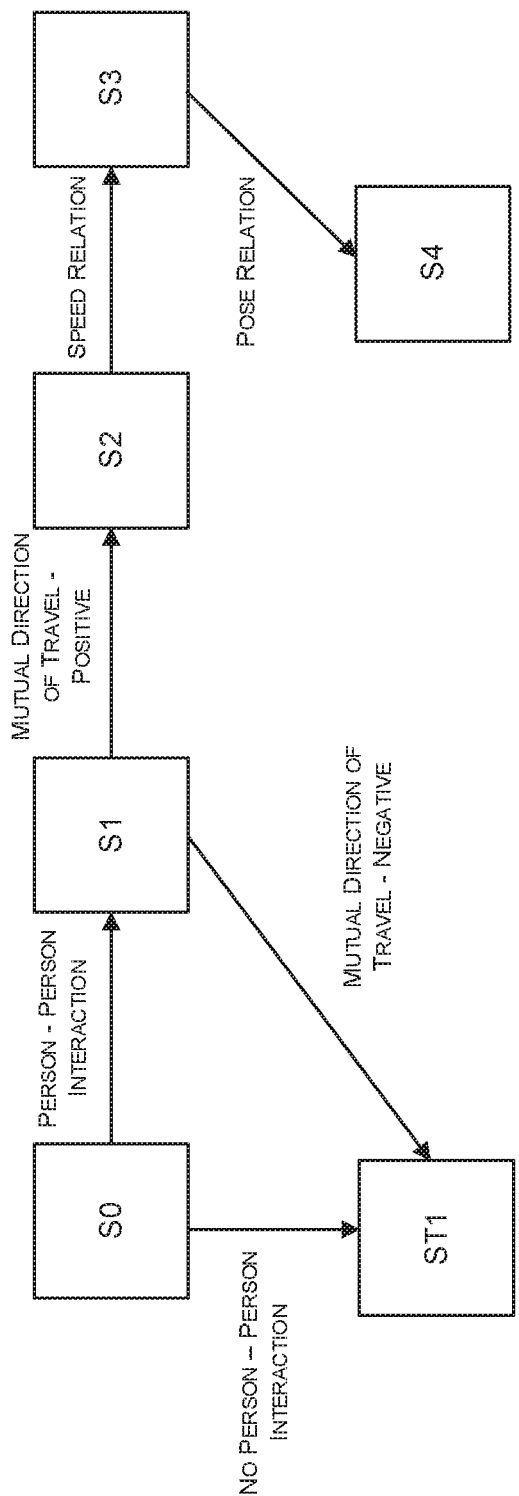
FIG. 4 is an automaton for use with an image processing system to detect violence.

FIG. 4 shows an automaton for the case where the image processing system is used for detecting violence. The automaton comprises an initial state S0 connected to state ST1 and also to state S1. State S1 is connected to both state S2 and state ST1, State S2 is connected to state S3 and state S3 is connected to state S4. A frame of a video begins in initial state S0 and moves to state ST1 if no person-person interaction is detected in the video frame. A frame of a video moves from state S0 to state S1 if a person-person interaction is detected in the video frame. A frame of a video moves from state S1 to state ST1 is there is no mutual direction of travel detected for the person-person interaction. A frame of a video moves from state S1 to state S2 if a mutual direction of travel is detected for the person-person interaction. A frame of a video moves from state S2 to state S3 if a speed relation is detected for the person-person interaction. A frame of a video moves from state S3 to state S4 if a pose relation is detected for the person-person interaction.

Figure 5:
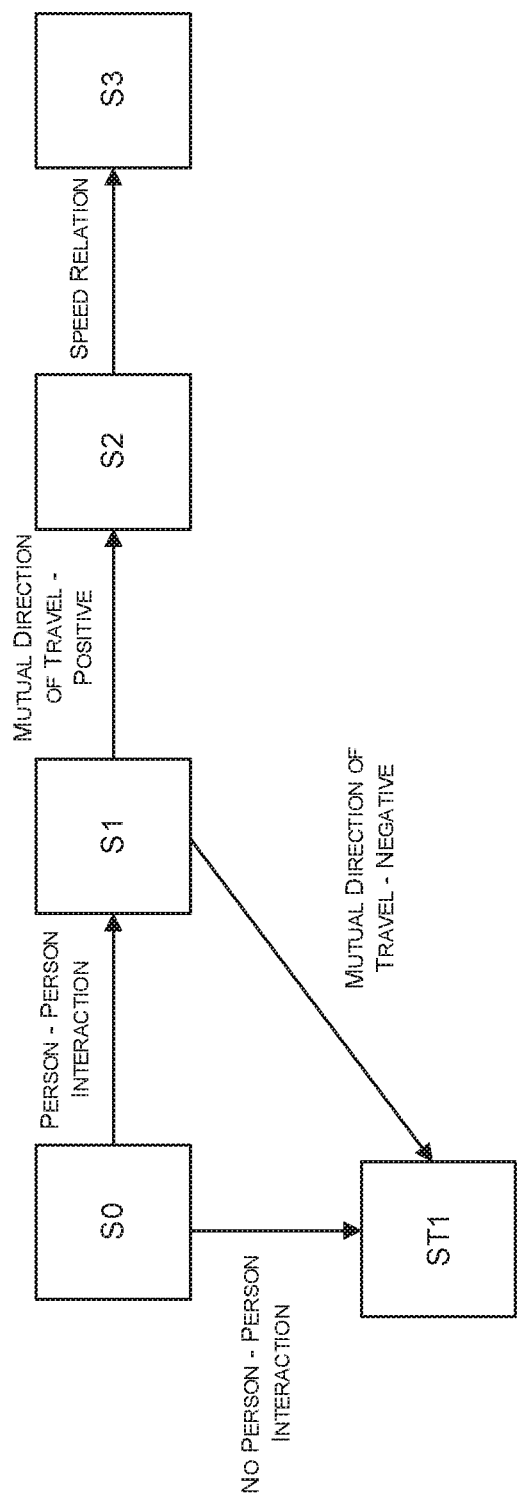
FIG. 5 is an automaton for use with an image processing system to detect commotion.

FIG. 5 shows an automaton for the case where the image processing system is used for detecting commotion. The automaton comprises an initial state S0 connected to state ST1 and also to state S1. State S1 is connected to both state S2 and state ST1. State S2 is connected to state S3. A frame of a video begins in initial state S0 and moves to state ST1 if no person-person interaction is detected in the video frame. A frame of a video moves from state S0 to state S1 if a person-person interaction is detected in the video frame. A frame of a video moves from state S1 to state ST1 is there is no mutual direction of travel detected for the person-person interaction. A frame of a video moves from state S1 to state S2 if a mutual direction of travel is detected for the person-person interaction. A frame of a video moves from state S2 to state S3 if a speed relation is detected for the person-person interaction.

Referring again to FIG. 2, the explanation 218 provides more information than merely which areas over the input instance the trained machine learning system looked at and how they were weighted to aggregate for explaining the end label. In addition, the present technology is achieved without the need for having questions about the task as part of the training data. In the present technology there is no requirement to have human-interpretable rules clearly depicted, but not mathematically formulated, in the input data. The present technology enables human-readable rules to be found which explain the reason why a particular multi-entity event is recognized, when no such rules are present in the input data.

Alternatively, or in addition, the functionality described in FIG. 2 is performed, at least in part, by one or more hardware logic components. For example, and without limitation, illustrative types of hardware logic components that are optionally used include Field-programmable Gate Arrays (FPGAs), Application-specific Integrated Circuits (ASICs). Application-specific Standard Products (ASSPs), System-on-a-chip systems (SOCs), Complex Programmable Logic Devices (CPLDs), Graphics Processing Units (GPU).

Figure 6:
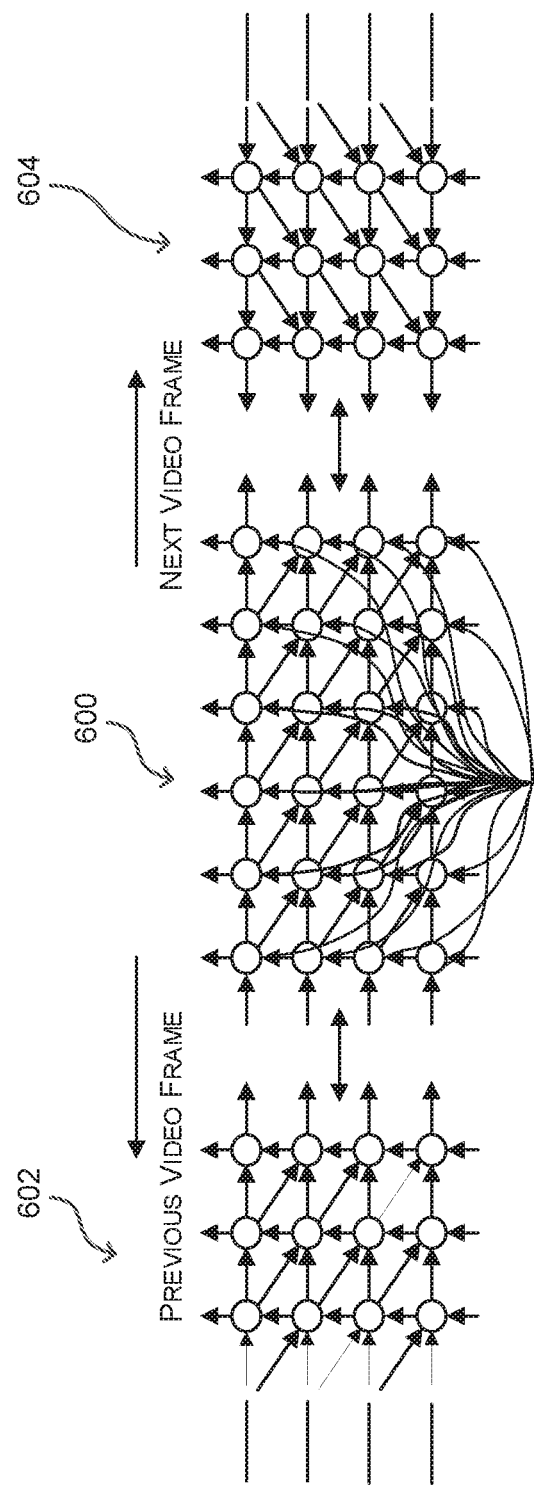
FIG. 6 shows part of a graph for three frames of a video.
Figure 7:
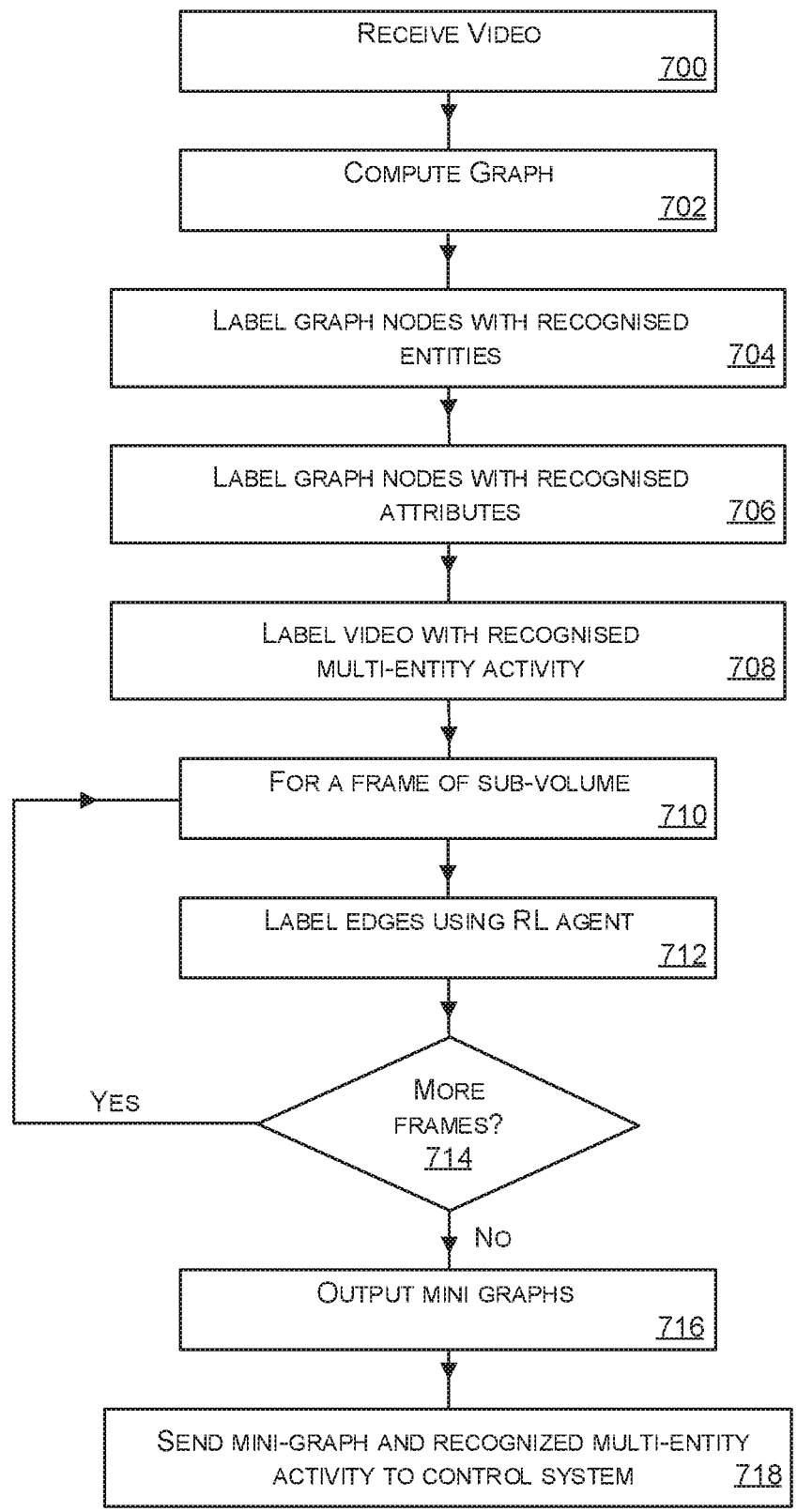
FIG. 7 is a flow diagram of a method of operating an image processing system such as that of FIG. 1.

More detail about the graph formation module 210 is now given with reference to FIG. 6. The graph formation module 210 computes a representation of the video 104 as a graph of nodes connected by edges. Each node of the graph comprises a link or reference to a plurality of pixels in a frame of the video 104. FIG. 6 shows part of the graph for three frames of the video 104: a current frame 600, a previous frame 602 and a subsequent frame 604. For each individual frame a grid of nodes represents cells of pixels of the corresponding frame where the frame is divided into a grid of cells. Each node is connected to its nearest neighbor node within the grid of nodes for the current frame as well as to its nearest neighbor nodes in the immediately preceding frame and the immediately subsequent frame. Each node is able to store information about entities depicted in the pixels of the video it represents as well as to store information about attributes of those entities, FIG. 7 has more detail about how the image processing system 100 operates after it has been trained. The image processing system 100 receives 700 a video from any suitable source as described with reference to FIGS. 1 and 2. From the video the graph formation module 210 computes a graph 702 as described above with reference to FIG. 6. The graph is provided as input to the trained machine learning system 212.

The trained machine learning system 212 comprises a plurality of neural networks or other trained machine learning models which have been trained to recognize entities depicted in videos and to recognize attributes of entities depicted in videos. A non-exhaustive list of examples of attributes is: position, velocity, acceleration, direction of travel, atomic human poses.

Any well-known neural network architectures are used for recognizing the entities and attributes. Examples of suitable neural network architectures are described in Simon et al. "Complex-YOLO: Real-time 3D object detection on point clouds" arXiv: 1803:06199; Ren et al, "Faster R-CNN: Towards real-time object detection with region proposal networks" arXiv:1506.01497; Cao et al. "OpenPose: real-time multi-person 2D pose estimation using part affinity fields" arXiv:1812.08008; Tsogkas et al. "Deep learning for semantic part segmentation with high-level guidance" arXiv:1505.02438

Once the entities and attributes have been recognized, entity and attribute labels are added 704, 706 to the relevant nodes of the graph from the graph formation module.

For a frame of the sub-volume 710 a processor 214 labels edges of the graph corresponding to that frame. The edges are labelled 712 using a trained reinforcement learning agent according to the reinforcement learning policy 206 and optionally also using an automaton.

Figure 8:
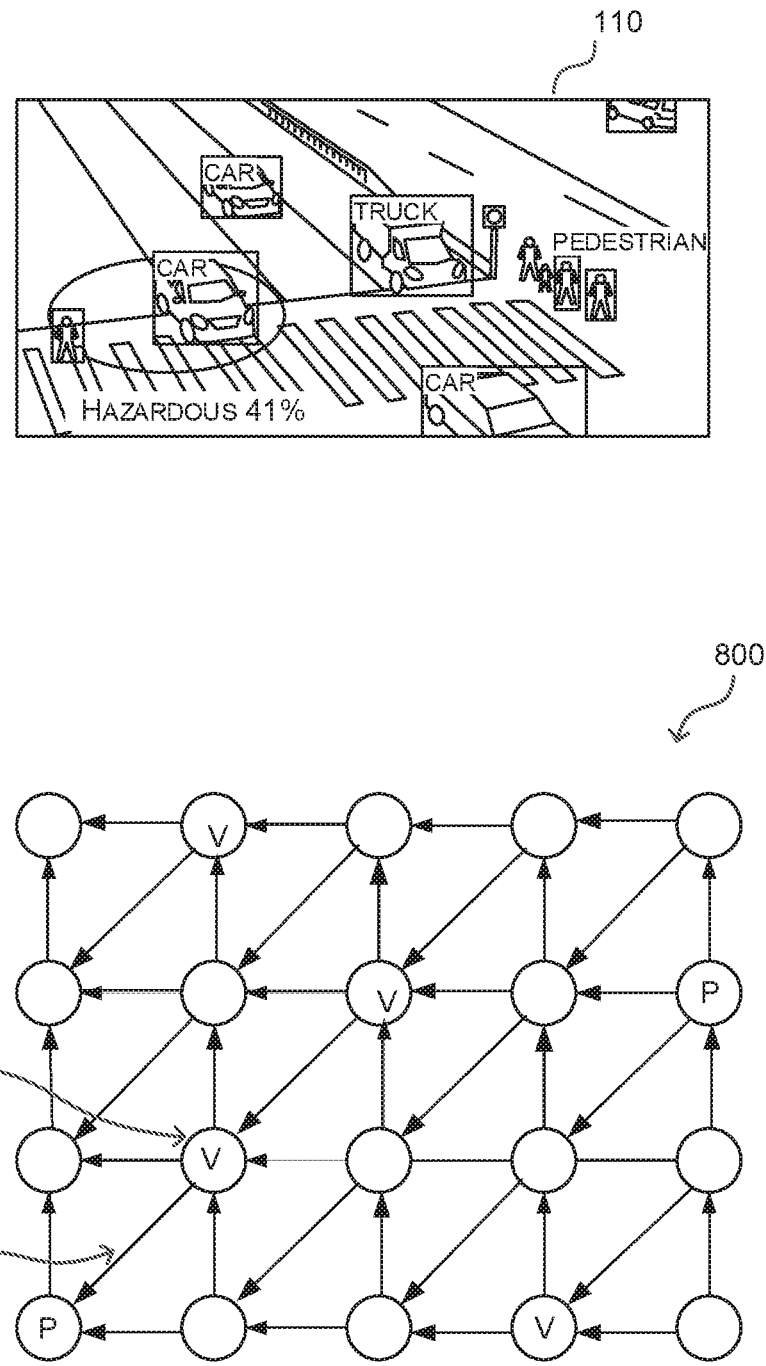
FIG. 8 shows a frame of a video labeled as depicting a road hazard with 41% certainty and an associated graph computed from the video frame.

Consider the graph in FIG. 8 which represents a video frame 110 labelled as depicting multi-entity event "hazardous" with certainty 41%. The graph edges are already directed as indicated in FIG. 8 by arrows, according to the pre-specified directions indicated in FIG. 6. In the example of FIG. 8 the start node is the one at the bottom left because of the arrangement of the arrows. The processor 214 begins at the start node and selects, for each edge emanating from the start node, a label from set S0 and a label from set S1. Set S0 comprises one and zero according to whether the edge is to be ignored or not (zero indicates that the edge is to be ignored as it is not predicted to be important for the explanation of the label "hazardous 41%"). The set S1 comprises all the possible domain specific language functions. In the present example the possible domain specific language functions are: TOWARDS(person, non-person), TOWARDS(person, person), TOWARDS(non-person, non-person), OPPOSITE(person, non-person), OPPOSITE(person, person), OPPOSITE(non-person, non-person), PARALLEL(person, non-person), PARALLEL(person, person). PARALLEL(non-person, non-person). Each domain specific language function has an outcome which is either true or false and is computable by using well known computer vision processing to analyze the video.

The processor 214 uses a reinforcement learning agent to make the selection from set S0 and the selection from set S1. Optionally the processor also uses an automaton to assist in making the selection from set S0 and the selection from set S1. The reinforcement learning agent has already been trained as described later in this document. The reinforcement learning agent comprises a neural network embodying a policy function of the reinforcement learning agent. The input to the neural network embodying the policy function of the reinforcement learning agent is the graph computed from the video frame and with the nodes of the graph labeled with entities and attributes as mentioned above. The output from the neural network is, for each edge emanating from the start node of the graph, a label from S0 and a label from S1. If the label from set S0 is zero the edge is pruned from the graph. If the label from set S0 is one the reinforcement learning agent selects from S1 one of the domain specific language functions whose outcome is true as computed using computer vision processing on the video.

The processor 214 repeats the process of selecting from set S0 and S1 for the edges of the graph in the sequence indicated by the arrows in FIG. 8 until the whole graph has been processed.

Optionally an automaton is used by the processor to reduce the number of options the reinforcement learning agent has to assess in order to label each edge. In the example of FIG. 8 which is about road hazard, the automaton which is optionally used is given in FIG. 3. When the reinforcement learning agent is trying to compute labels for the edges emanating from the first node in the graph, the video frame is in initial state S0. The reinforcement learning agent is able to limit its search to look for either a non-person to person edge (leading to state S1) or a person to person edge (leading to state ST1) because these are the only options to transition out of state S0 in the automaton. The processor is able to find the current state of the video frame in the automaton and look up the possible transitions from that current state in the automaton. The possible transitions limit the possible edge labels that the reinforcement learning agent is to consider.

In the example of FIG. 8 the initial node is labelled to indicate it depicts a person in the video frame and node 804 is labelled to indicate it depicts a vehicle in the video frame. Edge 802 is labelled by the reinforcement learning agent with domain specific language function TOWARDS(person, vehicle). It is then possible to use the domain specific language function TOWARDS(person, vehicle) to generate a rule or statement which is output by the processor. A human is able to interpret the rule or statement as an explanation of the label "hazardous 41%) which was assigned to the video frame by the trained machine learning system as described above.

Figure 9:
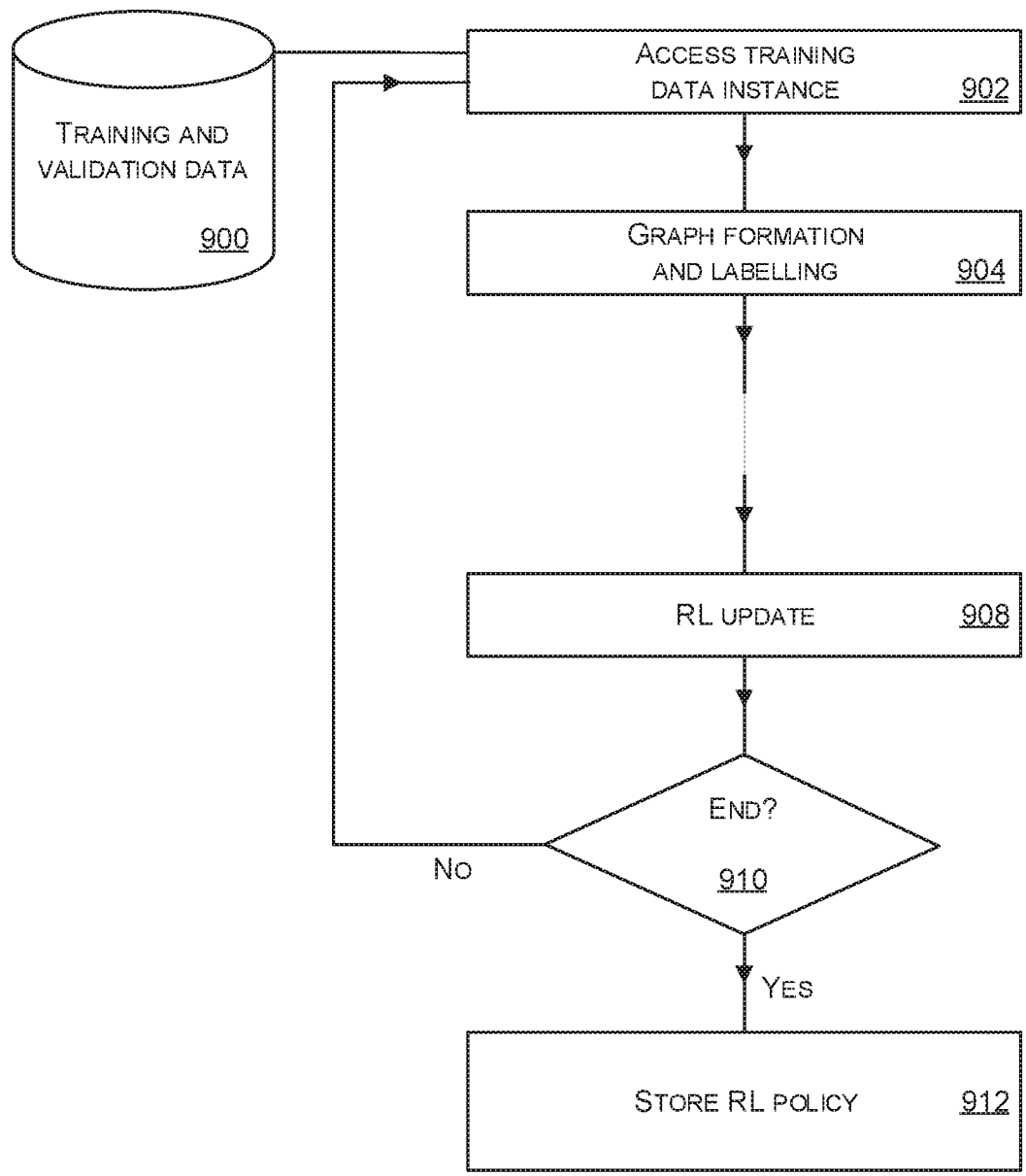
FIG. 9 is a flow diagram of a method of training an image processing system such as that of FIG. 1.

FIG. 9 is a flow diagram of a method of training the machine learning system 212 and reinforcement learning policy 206. Note that the neural networks used to recognize the entities and the attributes are trained using conventional methods which are not mentioned in FIG. 9 and which are already done prior to deployment of the present technology.

Stored training data 900 is available and a training data instance is accessed 902. The training data comprises videos labelled with multi-entity event labels. In an example there were 70 videos having around 300 instances of multi-entity activities. Each multi-entity event was on average 10 seconds long and having around 300 frames (in the case of 30 frames per second being the frame rate of the video). The training data comprises 90,000 instances and was divided into a training set and a validation set with the ratio 70:30.

The training data instance is processed by the graph formation module (210 of FIG. 2) to compute a graph representing the training data instance. The graph is labelled with entities and attributes as described with respect to operations 704 and 706 of FIG. 7.

A reinforcement learning update 908 is computed for each frame of the training instance. The reinforcement learning update 908 comprises updating the following reinforcement learning policy:

$$Q^{ij}(s_t, a_t) = Q^{ij}(s_t^{ij}, a_t) + \alpha[R(s_t, a_t) + \gamma Q^{ij}(s_{t+1}^{ij}, a_t)]$$

Which is expressed in words as, policy Q for an edge between nodes i and j, which has state $s_t$ (where state $s_t$ is the entity and attribute label of the node) and 2-tuple $a_t$ (which is to be found by making a selection from S0 as the first entry of the tuple and the selection S1 as the second entry of the tuple) for time t is equal to the policy Q for an edge between nodes i and j, which has state $s_t$ (where state $s_t$ is the entity and attribute label of the node) and 2-tuple $a_t$ (which is to be found) for time t plus a constant learning rate $\alpha$ multiplied by a reward signal R (which is the multi-entity event label of the frame) given the state $s_t$ and the 2-tuple plus a constant damping factor $\gamma$ times the policy for the edge given the state at time t plus 1 and the 2-tuple at time t, minus the policy for the edge given the state and time t and the 2-tuple at time t. Note that the conditional relation that if 0 is selected from S0, then selection from S1 is longer valid, is implemented by selecting a function NONE from S1 in that case.

The reinforcement learning policy stated above is for a single edge. In the case of labelling all the edges in a graph the following optimization is computed:

$$\arg\max_a \sum_{i,j} Q^{ij}(s_{t+1}^{ij}, a_t)$$

Which is expressed in words as the maximum over the 2-tuple labels of the sum over the edges in the graph of the policy for each of the states at time t+1 and each of the 2-tuple possible values.

A check is made at decision point 910 as to whether to finish training. Training is finished if the training data instances have been used up, or if a specified number of training iterations are completed. Training is finished in some cases if convergence has been reached. If training is to continue the operations repeat from operation 902. If training is ended the reinforcement learning policy is stored 912.

Figure 10:
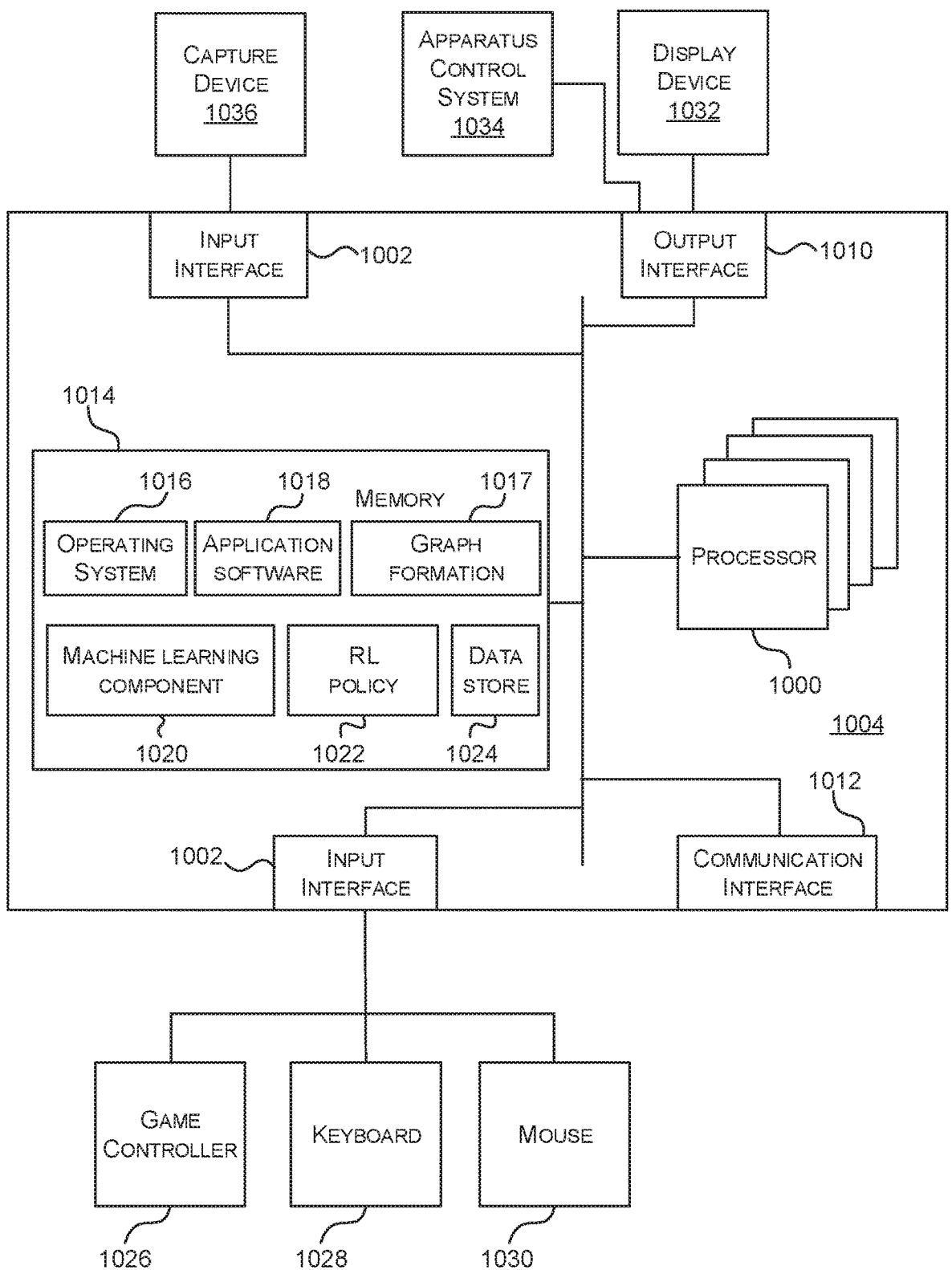
FIG. 10 illustrates an exemplary computing-based device in which embodiments of an explainable multi-entity recognition apparatus are implemented.

FIG. 10 illustrates various components of an exemplary computing-based device 600 which are implemented as any form of a computing and/or electronic device, and in which embodiments of an explainable multi-entity event recognition apparatus are implemented in some examples.

Computing-based device 1004 comprises one or more processors 1000 which are microprocessors, controllers or any other suitable type of processors for processing computer executable instructions to control the operation of the device in order to recognize multi-entity activities with explanation. In some examples, for example where a system on a chip architecture is used, the processors 1000 include one or more fixed function blocks (also referred to as accelerators) which implement a part of the method of any of FIGS. 7 and 9 in hardware (rather than software or firmware). Platform software comprising an operating system 1016 or any other suitable platform software is provided at the computing-based device to enable application software 1018 to be executed on the device. A reinforcement learning policy 1022 is stored in memory 1014 as well as a trained machine learning component 1020. A data store 1024 holds training data, videos, labels and other data. A graph formation component 1017 is also present.

The computer executable instructions are provided using any computer-readable media that is accessible by computing based device 1004. Computer-readable media includes, for example, computer storage media such as memory 1014 and communications media. Computer storage media, such as memory 1014, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1014) is shown within the computing-based device 1004 it will be appreciated that the storage is, in some examples, distributed or located remotely and accessed via a network or other communication link (e.g. using communication interface 1012).

The computing-based device 1004 also comprises an input interface 1002 arranged to receive input such as videos and other sensor data from a capture device 1036 or other entity. The input interface is also arranged to receive and process input from one or more devices, such as a user input device a mouse 1030, keyboard 1028, game controller 1026; or other input device. An output interface 1010 is arranged to output annotated videos and mini graphs to a display device 1032 and apparatus control system 1034. The display information may provide a graphical user interface.

Alternatively or in addition to the other examples described herein, examples include any combination of the following:

An image processing system for recognizing multi-entity activities, the image processing system comprising:

a memory storing a video depicting a multi-entity event, a trained reinforcement learning policy and a plurality of domain specific language functions;

a graph formation module configured to represent the video as a graph of nodes connected by edges;

a trained machine learning system configured to recognize entities depicted in the video and recognize attributes of the entities, such that labels are added to the nodes of the graph according to the recognized entities and attributes, the trained machine learning system also configured to compute a predicted multi-entity event depicted in the video;

a processor configured, for individual ones of the edges of the graph, to select an domain specific language function from the plurality of domain specific language functions and assign it to the edge, the selection being made according to the reinforcement learning policy;

an output arranged to output the predicted multi-entity event and an associated human-understandable explanation comprising the domain specific language functions assigned to edges in a volume of interest of the video depicting the multi-entity event. The image processing system recognizes multi-entity activities in videos in a fast and accurate manner and also provides human understandable explanation without needing to provide training data with information about rules.

The image processing system described above wherein the predicted multi-entity event is sent to a control system and triggers control of an apparatus selected from one or more of: an automated vehicle, a content distribution apparatus, a security apparatus, a sports training apparatus, a disaster recovery apparatus, a super-resolution apparatus, a video codec apparatus, an information retrieval apparatus, a digital personal assistant, a video collation apparatus. In this way downstream systems are controlled effectively and efficiently.

The image processing system described above wherein the output comprises a user interface adapted to receive input from a human in response to presentation of the human-understandable explanation so as to enable a human-in-the-loop deployment of the image processing system. Because the human has access to the explanation he or she is able to make effective adjustments to the control system.

The image processing system described above wherein the plurality of domain specific language functions comprises a plurality of domain specific language functions selected from: a relative velocity of two entities depicted in the video, a relative position of two entities depicted in the video, a relative acceleration of two entities depicted in the video. These domain specific language functions are found to be especially effective in providing human understandable explanations.

The image processing system as described above wherein the memory stores an automaton and wherein the processor is configured to make the selection using both the domain specific language and the reinforcement learning policy. By using an automaton it is possible to reduce the search space of the reinforcement learning policy and so give efficiency and it is found that the efficiency is achieved without unduly sacrificing accuracy of performance.

The image processing system as described above wherein the processor is configured, for individual ones of the edges of the graph, to select a binary label which indicates whether the edge is to be assigned a domain specific language function. By using binary label selection in this way a scalable solution is achieved. The reinforcement learning agent is able to select which edges to ignore and which to assign a domain specific language function to. In this way the amount of processing is reduced and attention is directed to graph nodes which are predicted to be important in generation of the explanation of the label of the video frame.

The image processing system as described above wherein the processor is configured to assign domain specific language functions to edges of the graph on a per-frame basis for individual frames of the video represented in the graph. Using a per-frame basis gives efficiency and works well in practice.

The image processing system described above wherein the trained machine learning system is configured to compute a volume of interest of the video, the volume of interest depicting the multi-entity event. By computing a volume of interest efficiencies are gained since it is not necessary to process the whole video for subsequent operations.

The image processing system as described above wherein the trained machine learning system comprises a graph long short-term memory neural network. Such an architecture is found to work well in practice.

The image processing system as described above wherein values of parameters of the reinforcement learning policy have been obtained by training using training data comprising volumes of interest of videos depicting known multi-agent activities.

The image processing system as described above wherein the trained machine learning system is a supervised machine learning system having been trained using training data comprising volumes of interest of videos depicting known multi-agent activities.

The image processing system described above wherein the trained machine learning system is trained separately from the reinforcement learning policy.

The image processing system described above wherein the trained machine learning system is trained jointly with the reinforcement learning policy.

The image processing system described above wherein the graph formation module forms, for individual frames of the video, a grid of nodes each node representing a patch of pixels of the video frame and connected to its nearest neighbor nodes in the grid representing the individual frame and in the grids representing the preceding and subsequent frame.

A computer-implemented method for recognizing multi-entity activities, the method comprising:
storing, at a memory, a video depicting a multi-entity event, a trained reinforcement learning policy and a plurality of domain specific language functions;
computing a representation of the video as a graph of nodes connected by edges;
operating a trained machine learning system to recognize entities depicted in the video and recognize attributes of the entities, and to compute a predicted multi-entity event depicted in the video;
adding labels to the nodes of the graph according to the recognized entities and attributes;
for individual ones of the edges of the graph, selecting a domain specific language function from the plurality of domain specific language functions and assigning it to the edge, the selection being made according to the reinforcement learning policy;
outputting the predicted multi-entity event and an associated human-understandable explanation comprising the domain specific language functions assigned to edges in a volume of interest of the video depicting the multi-entity event.

A computer-implemented method of training an image processing system for recognizing multi-entity activities and generating human-understandable explanations of the recognized multi-entity activities, the method comprising:
storing, at a memory, a reinforcement learning policy and a plurality of domain specific language functions;
accessing training data comprising videos depicting multi-agent activities, each video labelled as depicting a particular multi-agent event of a plurality of possible multi-agent activities, and wherein entities and attributes of the entities depicted in the videos are known;
for individual ones of the videos in the training data:
computing a representation of the video as a graph of nodes connected by edges and forming a machine learning model using the graph of nodes;
using supervised machine learning to train the machine learning mode to compute a predicted multi-entity event depicted in the video;
adding labels to the nodes of the graph according to the recognized entities and attributes;
using reinforcement learning to update the reinforcement learning policy.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language)

software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a pail or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. An image processing system for recognizing multi-entity activities, the image processing system comprising:

a memory storing a video depicting a multi-entity event, a trained reinforcement learning policy and a plurality of domain specific language functions;

a graph formation module configured to represent the video as a graph of nodes connected by edges;

a trained machine learning system configured to recognize entities depicted in the video and recognize attributes of the entities, such that labels are added to the nodes of the graph according to the recognized entities and attributes, the trained machine learning system also configured to compute a predicted multi-entity event depicted in the video;

a processor configured, for individual ones of the edges of the graph, to select a domain specific language function from the plurality of domain specific language functions and assign it to the edge, the selection being made according to the reinforcement learning policy;

an output arranged to output the predicted multi-entity event and an associated human-understandable explanation comprising the domain specific language functions assigned to edges in a volume of interest of the video depicting the multi-entity event.

2. The image processing system of claim 1 wherein the predicted multi-entity event is sent to a control system and triggers control of an apparatus selected from one or more of: an automated vehicle, a content distribution apparatus, a security apparatus, a sports training apparatus, a disaster recovery apparatus, a super-resolution apparatus, a video codec apparatus, an information retrieval apparatus, a digital personal assistant, a video collation apparatus.

3. The image processing system of claim 2 wherein the output comprises a user interface adapted to receive input from a human in response to presentation of the human-understandable explanation so as to enable a human-in-the-loop deployment of the image processing system.

4. The image processing system of claim 1 wherein the memory stores an automaton and wherein the processor is configured to make the selection using both the automaton and the reinforcement learning policy.

5. The image processing system of claim 1 wherein the processor is configured, for individual ones of the edges of the graph, to select a binary label which indicates whether the edge is to be assigned a domain specific language function.

6. The image processing system of claim 1 wherein the processor is configured to assign domain specific language functions to edges of the graph on a per-frame basis for individual frames of the video represented in the graph.

7. The image processing system of claim 1 wherein the trained machine learning system is configured to compute a volume of interest of the video, the volume of interest depicting the multi-entity event.

8. The image processing system of claim 1 wherein the trained machine learning system comprises a graph long short-term memory neural network.

9. The image processing system of claim 1 wherein values of parameters of the reinforcement learning policy have been obtained by training using training data comprising volumes of interest of videos depicting known multi-agent activities.

10. The image processing system of claim 1 wherein the trained machine learning system is a supervised machine learning system having been trained using training data comprising volumes of interest of videos depicting known multi-agent activities.

11. The image processing system of claim 1 wherein the trained machine learning system is trained separately from the reinforcement learning policy.

12. The image processing system of claim 1 wherein the trained machine learning system is trained jointly with the reinforcement learning policy.

13. The image processing system of claim 1 wherein the graph formation module forms, for individual frames of the video, a grid of nodes, each node representing a patch of pixels of the video frame and connected to its nearest neighbor nodes in the grid representing the individual frame and in the grids representing the preceding and subsequent frame.

14. A computer-implemented method for recognizing multi-entity activities, the method comprising:
- storing, at a memory, a video depicting a multi-entity event, a trained reinforcement learning policy and a plurality of domain specific language functions;
- computing a representation of the video as a graph of nodes connected by edges;
- operating a trained machine learning system to recognize entities depicted in the video and recognize attributes of the entities, and to compute a predicted multi-entity event depicted in the video;
- adding labels to the nodes of the graph according to the recognized entities and attributes;
- for individual ones of the edges of the graph, selecting a domain specific language function from the plurality of domain specific language functions and assigning it to the edge, the selection being made according to the reinforcement learning policy;
- outputting the predicted multi-entity event and an associated human-understandable explanation comprising the domain specific language functions assigned to edges in a volume of interest of the video depicting the multi-entity event.

15. The computer-implemented method of claim 14 comprising sending the predicted multi-entity event and the explanation to a control system and triggering control of an apparatus selected from one or more of: an automated vehicle, a content distribution apparatus, a security apparatus, a sports training apparatus, a disaster recovery apparatus, a super-resolution apparatus, a video codec apparatus, an information retrieval apparatus, a digital personal assistant, a video collation apparatus.

16. The computer-implemented method of claim 15 comprising displaying the explanation to a user and receiving in response user input influencing operation of the control system.

17. The computer-implemented method of claim 14 comprising storing an automaton and making the selection using both the automaton and the reinforcement learning policy.

18. The computer-implemented method of claim 14 comprising, for individual ones of the edges of the graph, selecting a binary label which indicates whether the edge is to be assigned a domain specific language function.

19. The computer-implemented method of claim 14 comprising obtaining values of parameters of the reinforcement learning policy by training using training data comprising volumes of interest of videos depicting known multi-agent activities.

20. A computer-implemented method of training an image processing system for recognizing multi-entity activities and generating human-understandable explanations of the recognized multi-entity activities, the method comprising:
- storing, at a memory, a reinforcement learning policy and a plurality of domain specific language functions;
- accessing training data comprising videos depicting multi-agent activities, each video labelled as depicting a particular multi-agent event of a plurality of possible multi-agent activities, and wherein entities and attributes of the entities depicted in the videos are known;
- for individual ones of the videos in the training data:
  - computing a representation of the video as a graph of nodes connected by edges and forming a machine learning model using the graph of nodes;
  - using supervised machine learning to train the machine learning model to compute a predicted multi-entity event depicted in the video;
  - adding labels to the nodes of the graph according to the recognized entities and attributes;
  - using reinforcement learning to update the reinforcement learning policy.

* * * * *